United States Patent
Roeck (10) Patent No.: US 7,453,770 B2
(45) Date of Patent: Nov. 18, 2008

(54) METHOD FOR DIRECTIONAL LOCATION AND LOCATING SYSTEM

(75) Inventor: Hans-Ueli Roeck, Hombrechitkon (CH)

(73) Assignee: Phonak AG, Stafa (CH)

( * ) Notice: Subject to any disclaimer, the term of this patent is extended or adjusted under 35 U.S.C. 154(b) by 0 days.

(21) Appl. No.: 11/839,235

(22) Filed: Aug. 15, 2007

(65) Prior Publication Data

US 2007/0286025 A1    Dec. 13, 2007

Related U.S. Application Data

(63) Continuation of application No. 10/998,502, filed on Nov. 29, 2004, now Pat. No. 7,266,043, which is a continuation of application No. 10/698,570, filed on Oct. 31, 2003, now Pat. No. 6,930,957, which is a continuation of application No. 10/180,585, filed on Jun. 26, 2002, now Pat. No. 6,687,187, which is a continuation of application No. 09/636,443, filed on Aug. 11, 2000, now Pat. No. 6,449,216.

(51) Int. Cl.
*G01S 3/80* (2006.01)
*H04R 3/00* (2006.01)

(52) U.S. Cl. .......................................... 367/118; 381/92

(58) Field of Classification Search ................ 367/124, 367/118, 135, 13; 381/312, 313, 316, 320
See application file for complete search history.

(56) References Cited

U.S. PATENT DOCUMENTS 4,198,705 A * 4/1980 Massa .......................... 367/126
4,305,141 A   12/1981 Massa
4,639,733 A   1/1987 King et al.
5,214,709 A   5/1993 Ribic
5,248,985 A   9/1993 Hammerle
5,289,544 A   2/1994 Franklin
5,729,507 A   3/1998 Massa
6,072,418 A   6/2000 Celton et al.
6,687,187 B2  2/2004 Roeck
6,930,957 B2* 8/2005 Roeck .......................... 367/124
7,149,320 B2* 12/2006 Haykin et al. ............... 381/320
7,266,043 B2* 9/2007 Roeck .......................... 367/124

(Continued)

FOREIGN PATENT DOCUMENTS

JP     360205269 A    10/1985
WO     00/33634 A2    6/2000

OTHER PUBLICATIONS

Kompis, M.; Feuz, P.; Valentini, G.; Pelizzone, M.; Engineering in Medicine and Biology Society, 1998, Proceedings of the 20th Annual International Conference of the IEEE, vol. 6, Oct. 29-Nov. 1, 1998, pp. 3136-3139 vol. 6.

*Primary Examiner*—Dan Pihulic
(74) *Attorney, Agent, or Firm*—Pearne & Gordon LLP (57) ABSTRACT

In order to locate electromagnetic or acoustic signal sources of a sensor configuration (1 *a* through 1 *c*) fitted with at least two electric outputs; where the incidence-dependent transfer functions between the acoustic signals incident on the input(s) of the sensor configuration (1 *a* through 1 *c*) and the electric output signals are different, the ratio ($7_X$ through $7_{XX}$) of the output signal is formed and the result then is correlated with the previously determined ratio function (11).

14 Claims, 5 Drawing Sheets

U.S. PATENT DOCUMENTS

| | | | |
|---|---|---|---|
| 2002/0021814 A1* | 2/2002 | Roeck | 381/312 |
| 2002/0150264 A1* | 10/2002 | Allegro et al. | 381/94.1 |
| 2002/0176587 A1* | 11/2002 | Roeck | 381/92 |
| 2003/0016588 A1* | 1/2003 | Roeck | 367/124 |
| 2003/0031335 A1* | 2/2003 | Roeck | 381/317 |
| 2003/0071635 A1* | 4/2003 | Roeck | 324/614 |
| 2003/0091197 A1* | 5/2003 | Roeck et al. | 381/60 |
| 2004/0047480 A1* | 3/2004 | Roeck | 381/312 |
| 2004/0095849 A1* | 5/2004 | Roeck | 367/124 |
| 2004/0175005 A1* | 9/2004 | Roeck | 381/74 |
| 2004/0175008 A1* | 9/2004 | Roeck et al. | 381/312 |
| 2004/0175012 A1* | 9/2004 | Roeck et al. | 381/317 |
| 2005/0069162 A1* | 3/2005 | Haykin et al. | 381/312 |
| 2005/0078556 A1* | 4/2005 | Roeck | 367/124 |
| 2005/0152568 A1* | 7/2005 | Roeck | 381/323 |
| 2005/0175199 A1* | 8/2005 | Roeck | 381/312 |
| 2005/0201579 A1* | 9/2005 | Roeck | 381/318 |
| 2005/0244023 A1* | 11/2005 | Roeck | 381/321 |
| 2005/0249359 A1* | 11/2005 | Roeck | 381/92 |
| 2006/0013424 A1* | 1/2006 | Roeck | 381/321 |
| 2006/0104463 A1* | 5/2006 | Roeck | 381/312 |
| 2006/0291680 A1* | 12/2006 | Roeck | 381/315 |
| 2007/0030987 A1* | 2/2007 | Roeck et al. | 381/312 |
| 2007/0036280 A1* | 2/2007 | Roeck et al. | 379/52 |
| 2007/0076909 A1* | 4/2007 | Roeck et al. | 381/312 |
| 2007/0100605 A1* | 5/2007 | Renevey et al. | 704/201 |
| 2007/0223754 A1* | 9/2007 | Roeck et al. | 381/313 |
| 2007/0269053 A1* | 11/2007 | Meier et al. | 381/74 |
| 2007/0269064 A1* | 11/2007 | Allegro-Baumann et al. | 381/313 |
| 2007/0286025 A1* | 12/2007 | Roeck | 367/124 |

* cited by examiner

METHOD FOR DIRECTIONAL LOCATION AND LOCATING SYSTEM

BACKGROUND OF THE INVENTION

The present invention relates to a method of directionally locating an electromagnetic or acoustic signal source.

The insights leading to the present invention were acquired from the needs relating to directionally locating acoustic signal sources. Accordingly the present description of the invention mostly concerns directionally locating acoustic sources. Nonetheless the expert easily understands that this invention is immediately applicable also to locating electromagnetic signal sources. The problem of ascertaining which kind the sources are being located only affects the kinds of sensors used in this invention. In the special case of locating acoustic signals, the sensor configuration is a set of microphones whereas when locating electromagnetic sources the system consists of a set of antennas followed by antenna amplifiers.

Presently procedures are known, which are mathematically complex or demand substantial equipment in order to locate such sources, especially in a field of several sources. If now less equipment is used by reducing the number of sensors, the mathematical complexity relating to source-location discrimination will increase. When locating acoustic signal sources, illustratively the determination of phase differences between acoustic signals simultaneously incident on the microphones of the microphone configuration will be selected.

BRIEF SUMMARY OF THE INVENTION

The objective of the present invention is to propose a directional location method and a corresponding system whereby the cited costs can be drastically reduced.

This goal is reached based on a method of the above cited kind which is implemented by the features of claim 1.

When using a sensor configuration of at leas two electric outputs, and different transfer functions—in the form of receiving lobes regarding the dependence of the electric output signals on the direction of incidence of the input signals—are effective between the electromagnetic or acoustic input and the aforementioned at least two electric outputs, then it was observed that by taking the ratio of signals representing the said output signals, a ratio function is formed which is unambiguous relative to the angular position of a source and which is independent of the signal level. In this manner the proposed method unambiguously determines an angular position at minimum design complexity and this method is basic in' ascertaining two angular positions per source and to spatially unambiguously determine the source position in the sense of a located beam and/or, in the case of simultaneously active sources, to locate said sources at least within the scope of said cited one angular position. As shall be elucidated farther below, when locating the source position, a position cone results from the cited ratio, the aperture angle of said cone being used as position coordinate.

The unambiguous directional position of a source, that is, the location of a local source beam, is possible in a preferred implementation of the invention by analyzing at least three of the cited ratios, and for that purpose at least three electric outputs are provided each of which is associated with a different transfer function of the above stated kind, that is having different receiving characteristics.

When the method discussed so far is used in an environment holding a single, active signal source, then said source's position shall be determined. If on the other hand several sources are simultaneously active, a spectrum of angular positions results and a single measurement does not immediately reveal how many sources are active at a particular directional location.

For that purpose a further preferred implementation of the invention proposes carrying out the said generation of ratios several times in time-staggered manner and creating a histogram function from the ratios and correlating said histogram function with the previously determined ratios/incidences dependences and to ascertain therefrom the directional position of at least one source.

This procedure is used preferably both when implementing the method of the invention using two of the cited outputs as well as the implementation using three outputs.

In the proposed histogram function, electromagnetic or acoustic signals from sources that have been active for some extended time will result in equal ratios and this phenomenon leads to accumulating these values in the attained histogram function. When correlated with the dependence of ratio and incidence that was determined beforehand, said accumulating values lead directly to ascertaining the particular at least one angular position of the signal sources active in the field.

In another preferred implementing mode, the output signals from the above mentioned sensor configurations are analyzed in the frequency domain. Considering that the cited transfer characteristics change only within the rolloff range, then it follows that the effect of the frequency will, be eliminated when forming the ratio, especially so when the selected transfer characteristics all have the same rolloff behavior. Therefore signal analysis in the frequency domain not only makes it possible to set up the said histogram from time-staggered measurements, but also from the spectrum ratios simultaneously ascertained in the frequency domain.

Preferably the transfer characteristics associated with the particular outputs are selected so that they differ merely by a solid-angle phase shift, i.e. that they "look" in a different direction but otherwise are identical.

A system of the above mentioned kind is defined by the features of claim 6, preferably in the embodiments of claims 7 through 10. The method of the invention and the system of the invention are especially well suited in locating acoustic sources and, because of the simple equipment and low need for computation, they are especially applicable to hearing aids.

DETAILED DESCRIPTION OF THE INVENTION

The invention is elucidated in illustrative manner below and in relation to the attached drawings.

The method of the invention is outlined in FIGS. 1 through 4 without claim to scientific rigor using simple transfer characteristics each corresponding to first-order cardioids. By means of this simple procedure described below in easily followed manner, the expert will understand how one or more acoustic sources can be located in the manner of the invention using fairly complex transfer functions.

Figure 1A:
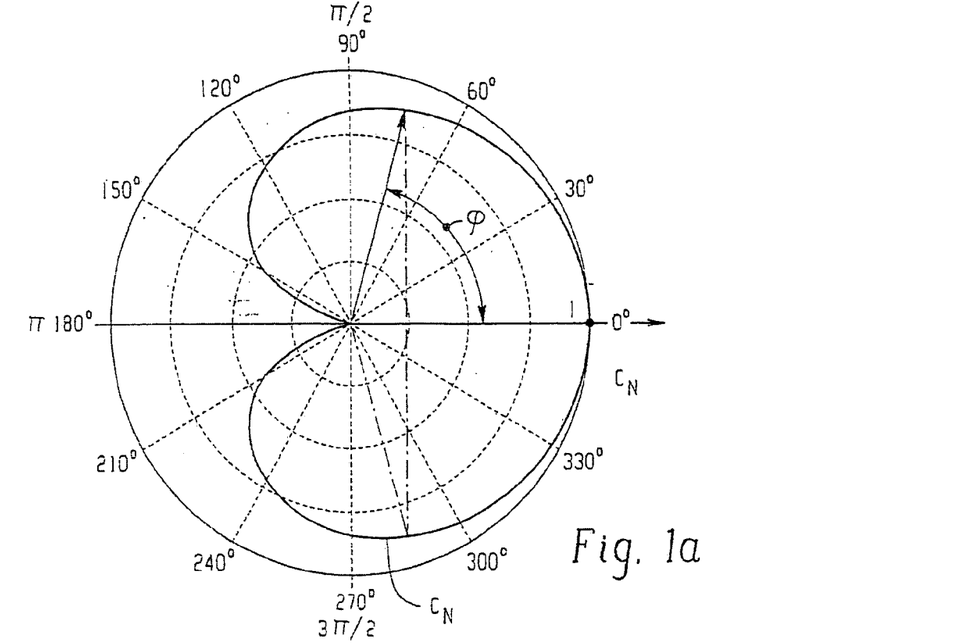
FIGS. 1*a*, 1*b* show preferred transfer characteristics used in the invention to locate acoustic sources for two sub microphone configurations used in the minimum design.

A first sub microphone circuit—which broadly is called the sensor configuration—of a microphone or sensor configuration is assumed being fitted with the 3D transfer function shown in 2D in FIG. 1a having the transfer/amplification characteristic of a signal incident on it in the direction ÿ.

Figure 1B:
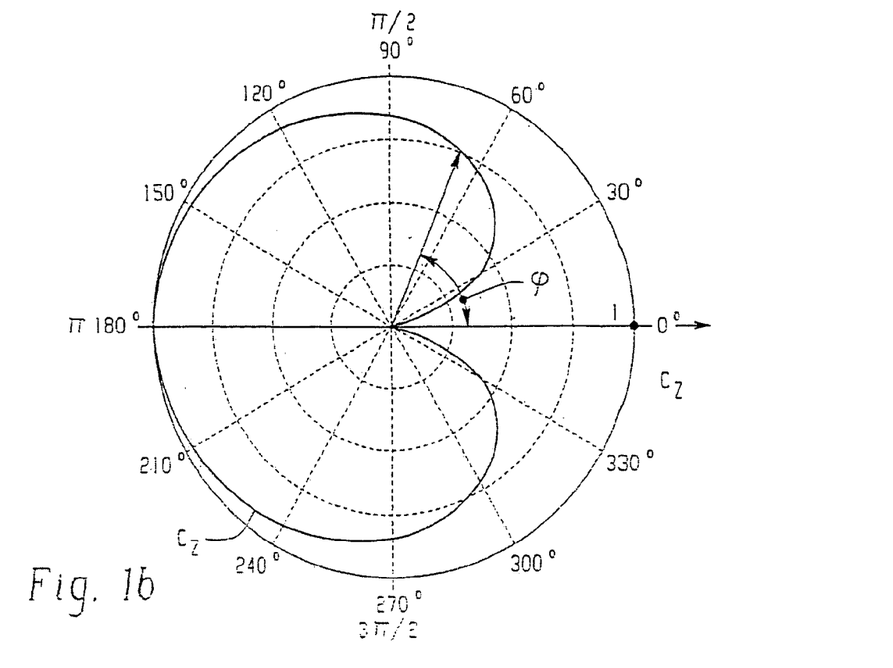
Figure 1C:
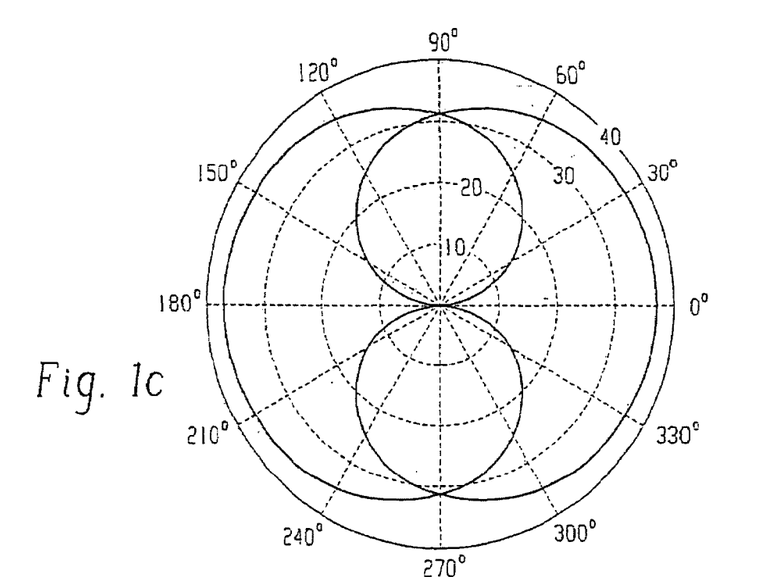
FIG. 1*c* shows the common spatial orientation of the transfer characteristics of the sub microphone configuration of FIGS. 1*a* and 1*b*.
Figure 2:
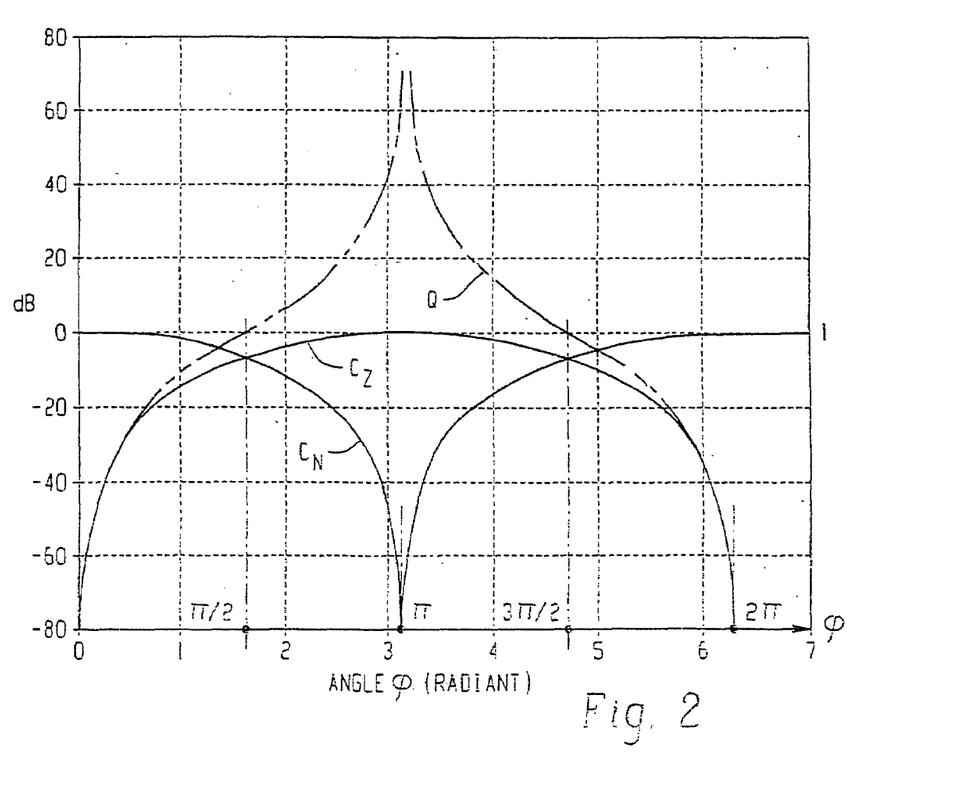
FIG. 2 shows the particular transfer characteristic and the ratio over one of the solid angles ÿ of FIGS. 1*a* and 1*b*.

In a view similar to FIG. 1a, FIG. 1b shows a second sensor configuration's transfer function which is assumed the mirror image relative to the axis ÿ/2; 3ÿ/2 to the first sensor array. The transfer function of FIG. 1a is denoted by $c_N$ and that of FIG. 1b by $c_Z$. FIG. 1c simultaneously shows the transfer functions $c_N$ and $c_Z$ as they are present in a sensor array with corresponding sub sensor circuits and two electric outputs. As already mentioned, the location is that of acoustic sources and the systems are microphone configurations. FIG. 2 shows the values in dB of the transfer functions $c_N$ or $c_Z$ depending on the ÿ axis of FIGS. 1a-1c.

If unit signals are incident on the two sub sensor arrays, the transfer functions shown in FIGS. 1a and 1b simultaneously correspond to the particular signal values at the outputs of the sensor configurations being considered In the invention, the ratio is then formed from these two output signals which also are denoted by $c_N$ and $c_Z$, namely $$Q = |c_N|^{-1}|c_Z|.$$

Figure 3:
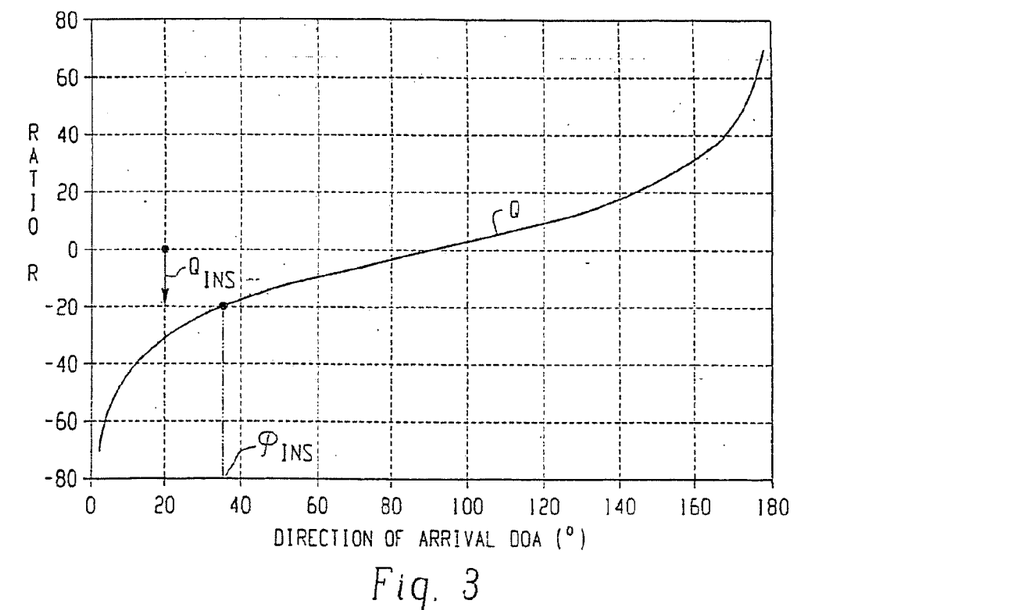
FIG. 3 shows the ratio of FIG. 2 as a function of the solid angle ÿ to elucidate the correlation of the actual measurement and pre-known dependence between ratio and angle

The function Q is qualitatively shown in FIG. 2 in dashed lines with a pole at ÿ=ÿ. In FIG. 3 the function Q(ÿ) is again plotted between ÿ=0 and ÿ=ÿ.

Be it borne in mind that when forming the ratio Q, which for clarity was initially discussed for unit signals, the particular values of the input signals cancel out and that as a result the angular dependence shown in FIG. 3 applies to arbitrary signals incident at an angle ÿ on the sensor array.

When such a function is measured and stored and, as shown in FIG. 3, the instantaneous ratio $Q_{INS}$ is formed from an instantaneously incident signal INS, and is rendered again in dB, then this dB value can be correlated with the stored ratio function Q(ÿ), that is, it can be entered into the previously stored function/dependence Q(ÿ): the directional position $ÿ_{ins}$ of the instantaneously incident acoustic signal is determined.

As can be inferred from FIG. 3 and as is anyway obvious from FIGS. 1a and 1b, the ratio function Q(ÿ) is unambiguous from 0 to 180°, though only in the 2D sectional plane through the transmission lobes shown in FIGS. 1a and 1b. A positional angle ÿ is determined which corresponds to a position cone shown in dashed lines in FIG. 1a for the aperture angle ÿ shown therein.

If location must be determined unambiguously, at least three of the above cited sub sensor circuits must be used and correspondingly one sensor configuration with three outputs. Derivation of the ratio in the manner described above and the correlation with the particular pre-recorded dependences Q(ÿ) are carried out pairwise on two, preferably three circuit output signals.

Even though the position information ascertained so far reveals that an acoustic signal was determined from the cited directional position whether for two sub sensor circuits corresponding to one position cone or spatially for more than two sensor configurations by means of two or one position beams, no more is known than that instantaneously an acoustic signal is incident from the cited direction. Accordingly a located signal source is instantaneously active.

However in order to obtain information on the position of a source active over a substantial time interval in distinction from stochastically distributed acoustic signals incident form different directions, basically the observation runs over the time interval about which directional position contains an accumulation of signals with the conclusion that an acoustic signal source is located there.

Figure 4:
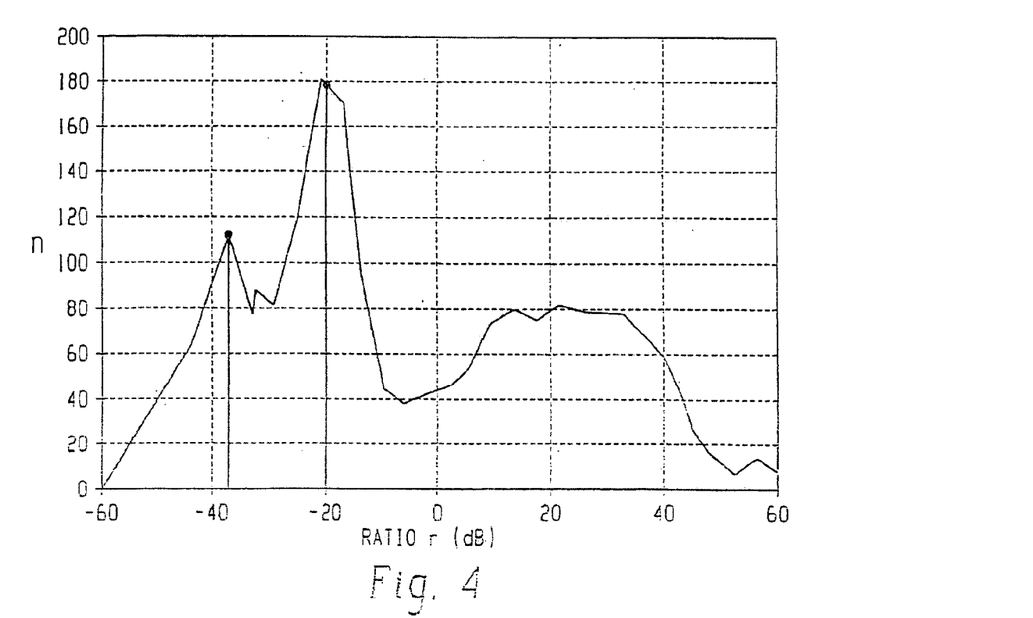
FIG. 4 shows an illustrative histogram derived from time-staggered ascertained

For that purpose the cited ratio $Q_{INS}$ is derived again from the output signals so that, as illustratively shown in FIG. 4, a histogram may be drawn up. Accordingly the frequencies are recorded (in dB according to FIG. 4) in ratio-value specific manner. FIG. 4 shows an illustrative recorded histogram with a frequency n of ratio values that occurred. The inference is that, according to the accumulation, an acoustic signal source is active at about −38 dB and at −20 dB according to FIG. 3 in the direction ÿ=15° and another at ÿ −35°.

The proposed method is usually appropriate for execution in the frequency domain. If it be taken into consideration that the transfer functions such as shown in FIGS. 1a and 1b because of frequency rolloff each change in frequency in similar manner, then it follows that the cited ratio function becomes frequency independent. Thereby the sensor configuration's output signals may be converted consecutively several times into the frequency domain and said ratio derivation—which contains the same directional information independently of frequency—can be carried out for a selected number of amplitudes in the frequency spectrum.

Using a number N of sub sensor circuits, in particular microphone configurations, the proposed method makes it possible to locate, a possibly substantially larger number M of especially acoustic signal sources. If more than two sub sensor configurations are used, it will be feasible to unambiguously carry out spatial location. Furthermore and illustratively, the distribution shown in FIG. 4 shows that in angular position range of 110 to 130°, two or more possible identical sources are highly likely to be active.

Figure 5:
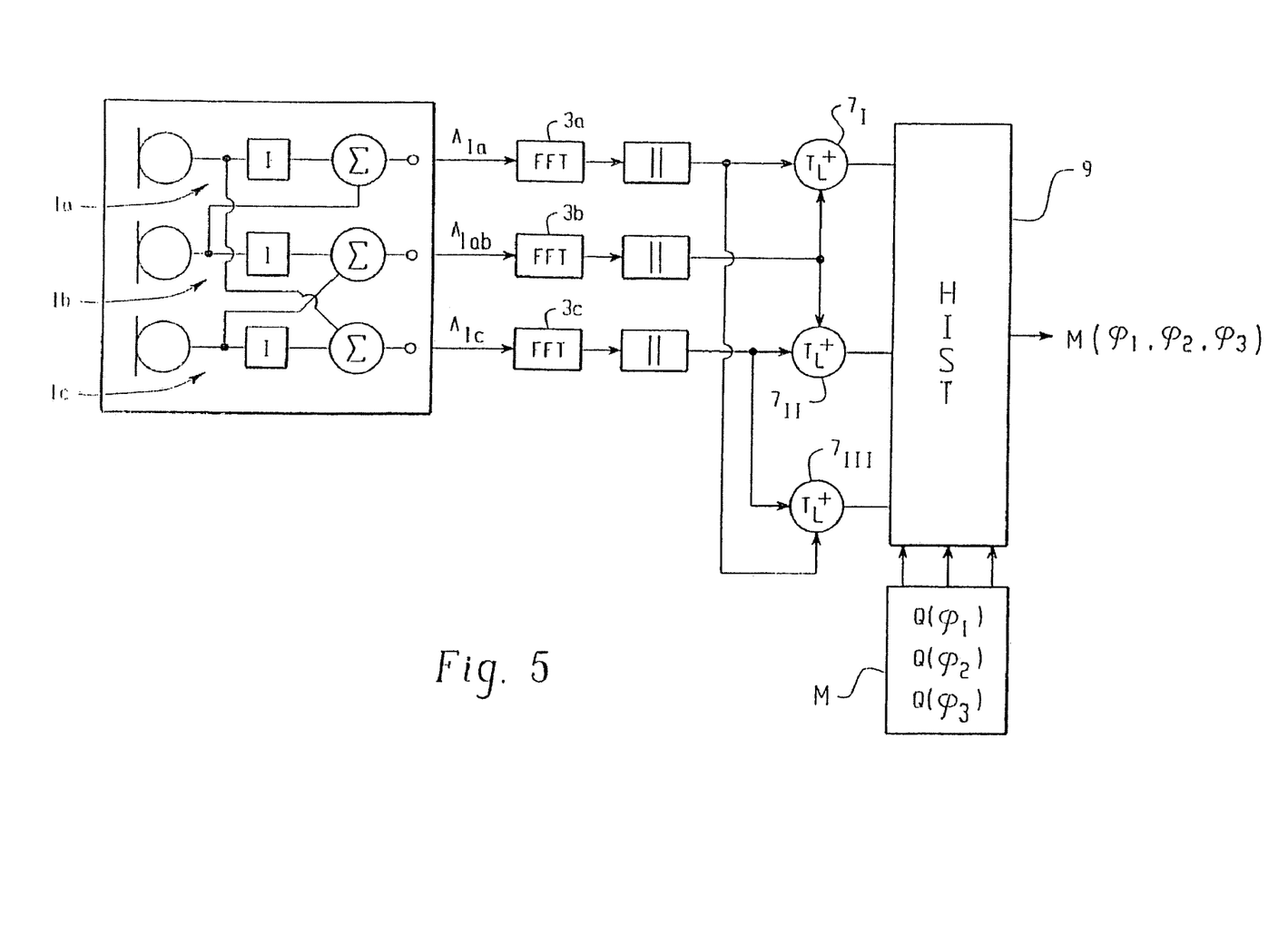
FIG. 5 is a simplified signal-flow/functional block diagram of a position-locating system designed in the manner of the invention and operating on the basis of the method of the invention, used with acoustic sources and in a preferred embodiment mode.

FIG. 5 is a simplified signal-flow/functional block diagram of a positioning system operating by the method of the invention and illustratively shown for acoustic signals. It is especially well suited for a hearing aid.

Figures 6A, 6B:
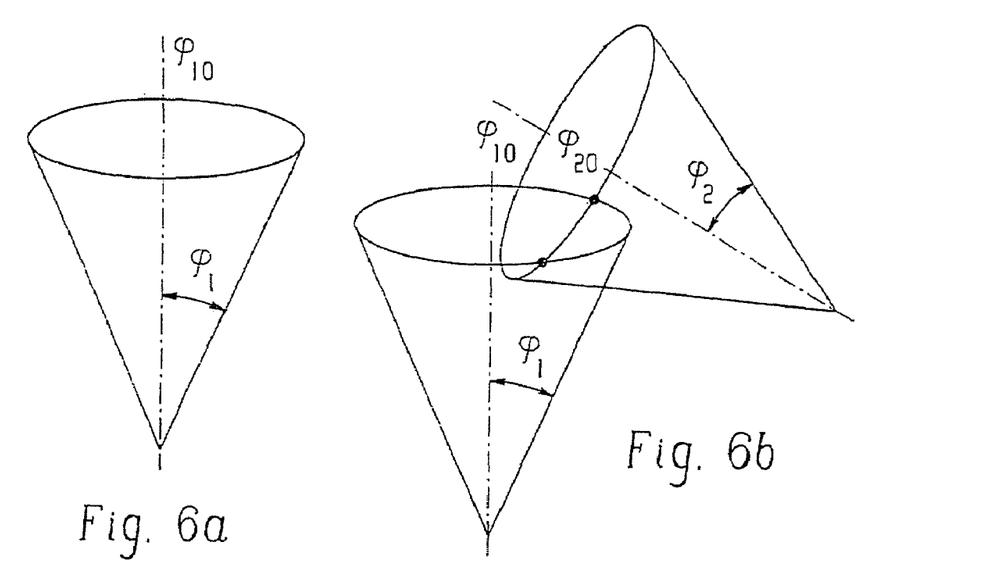
FIG. 6a shows the position of a signal source determined by the method or the system of the invention in its minimum design.
FIG. 6b shows two locating beams ascertained in a further development of the invention.
Figure 6C:
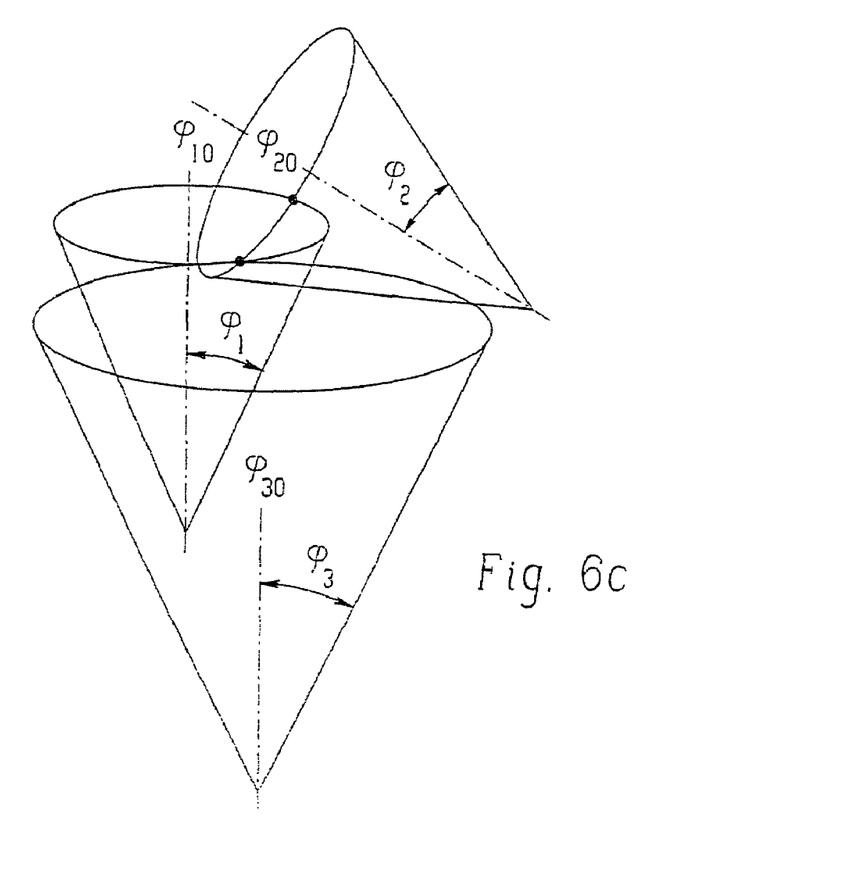
FIG. 6c shows the determination of a locating beam determined in a further preferred embodiment of the invention.

The system of the invention comprises a microphone configuration 1 comprising at least two sub-microphones $1_X$ as shown with three sub-microphone circuits 1b-1c running to corresponding outputs $A_{1a}$ through $A_{1c}$. The three sub-microphone circuits are of different transfer functions, for instance being first-order cardioids pointing in different directions, such a design illustratively and preferably being implemented by the sub-microphone circuits being two microphones of which the outputs are linked to each other in the "delay and add" manner. Using three sub-microphone circuits implements a third cardioid in turn making it possible—as elucidated farther below—to derive simultaneously two or three ratios. In this manner two position cones are implemented as shown in FIG. 6b or three as shown in FIG. 6c. When there are two position cones, a source still is ambiguous, whereas when there are three it shall be located unambiguously.

In a preferred embodiment, the output signals $A_{xy}$ are converted into the frequency domain at time/frequency transducer units FFT 3a-3c. The outputs of the time/frequency transducer units 3a-3c are operationally and pairwise connected as shown each through value forming units with denominator or nominator inputs of three ratio-forming units $7_1$ through $7_{111}$. The outputs of the ratio-forming units $7_1$ through $7_{111}$ are operationally connected to an analyzer 9 where, as already discussed, in particular the histograms will be formed. In order to implement the correlation of the determined ratio-value distributions with the ratio/angular-position dependence, and as schematically shown in FIG. 5, the functions $Q(\ddot{y}_1)$ through $Q(\ddot{y}_3)$ are fed to the analyzer 9. These functions were measured/computed beforehand using the sensor configuration 1 if present and are shown in schematic manner stored in the function memory 11. The symbols $\ddot{y}_1$ through $\ddot{y}_3$ denote the aperture angle of the position cone of FIGS. 6a through 6c, Performing an appropriate conversion in the analyzer 9, that is analyzing the histogram distribution and associating its peak values to the corresponding position angles $\ddot{y}_1$ through $\ddot{y}_3$, then recalculating appropriately depending on the desired position coordinates, the output of the analyzer 9 will display the number M of detected acoustic sources together with their angular positions.

The proposed method of the invention is unusually well suited to hearing aids and may be used to point the directional characteristics of a hearing aid toward detected sources or—if such sources were defined or known to be spurious—to introduce high attenuation in said located direction.

Basically all known or microphone/sensors and their combinations maybe used as sub microphone circuits/sub sensor circuits, said circuits being fitted with different transfer functions as required in the operational position and as required regarding acoustic signals incident at an angle $\ddot{y}$.

However the invention proposes, especially for simple and easily monitored implementation, that identical sub sensor circuits be used of which the transfer functions while being identical on the other hand with respect to their axial alignment (corresponding to $\ddot{y}=0$) in FIG. 1a) shall be directed differently spatially.

The method of the invention makes it possible—without determining signal phases/signal time delays and without using corresponding laborious log taking of complex variables—to locate in exceedingly simple manner signal sources in the surroundings—by forming ratios and then by analysis—in particular with respect to acoustic sources in an acoustic field.

The invention claimed is:

1. A method for controlling the directional characteristic of a hearing device comprising the steps of:
   detecting directional orientation of distinct acoustical sources with respect to the hearing device;
   analyzing in dependency of said directional orientation said sources to obtain a function depending on a statistical distribution of a characteristic of said sources; and
   pointing the directional characteristic of the hearing device toward at least one source which satisfies a criterion according to said function.

2. The method according to claim 1 wherein the step of pointing the directional characteristic comprises adjusting a transfer function of the hearing device.

3. The method according to claim 1 wherein the directional characteristic is pointed toward plural sources which satisfy a criterion according to said function.

4. A method for controlling the directional characteristic of a hearing device comprising the steps of:
   detecting directional orientation of distinct acoustical sources with respect to the hearing device;
   analyzing in dependency of said directional orientation said sources to obtain a function depending on a statistical distribution of a characteristic of said sources; and
   adjusting a transfer function of the hearing device for acoustical signals received from at least one source which satisfies a criterion according to said function.

5. A method for controlling the directional characteristic of a hearing device comprising the steps of:
   detecting directional orientation of distinct acoustical sources with respect to the hearing device;
   forming a histogram of said directional orientations of said sources; and
   pointing the directional characteristic of the hearing device toward at least one source which satisfies a predetermined criterion with respect to directional orientation in said histogram.

6. A method according to claim 5 wherein the step of pointing the directional characteristic comprises adjusting a transfer function of the hearing device.

7. The method according to claim 6 wherein the directional characteristic is pointed toward plural sources which satisfy a criterion according to said function.

8. A method for controlling the transfer characteristic between acoustical signals impinging upon a hearing device and mechanical signals transmitted to an individual's ear comprising the steps of:
   detecting directional orientation of distinct acoustical sources with respect to the hearing device;
   analyzing in dependency of said directional orientation said sources to obtain a function depending on a statistical distribution of a characteristic of said sources; and
   pointing a directional characteristic of the hearing device toward at least one source which satisfies a criterion according to said function.

9. The method according to claim 8 wherein the directional characteristic is pointed toward plural sources which satisfy a criterion according to said function.

10. A method according to claim 8 wherein the step of pointing the directional characteristic comprises adjusting a transfer function of the hearing device.

11. A method for controlling the transfer characteristic between acoustical signals impinging upon a hearing device and mechanical signals transmitted to an individual's ear comprising the steps of:
    detecting directional orientation of distinct acoustical sources with respect to the hearing device;
    analyzing in dependency of said directional orientation said sources to obtain a function depending on a statistical distribution of a characteristic of said sources; and
    adjusting a transfer function of the hearing device for acoustical signals received from at least one source which satisfies a criterion according to said function.

12. A method for controlling the transfer characteristic between acoustical signals impinging upon a hearing device and mechanical signals transmitted to an individual's ear comprising the steps of:
    detecting directional orientation of distinct acoustical sources with respect to the hearing device;
    forming a histogram of said directional orientations of said sources; and
    pointing a directional characteristic of the hearing device toward at least one source which satisfies a predetermined criterion with respect to directional orientation in said histogram.

13. The method according to claim 12 wherein the directional characteristic is pointed toward plural sources which satisfy said criterion.

14. The method according to claim 11 wherein the directional characteristic is pointed toward plural sources which satisfy a criterion according to said function.

\* \* \* \* \*

UNITED STATES PATENT AND TRADEMARK OFFICE
CERTIFICATE OF CORRECTION

PATENT NO.       : 7,453,770 B2  
APPLICATION NO.  : 11/839235  
DATED            : November 18, 2008  
INVENTOR(S)      : Hans-Ueli Roeck Page 1 of 1

It is certified that error appears in the above-identified patent and that said Letters Patent is hereby corrected as shown below:

Column 2, line 62, please insert the word -- ratios -- after the word "ascertained."

Signed and Sealed this

Seventeenth Day of March, 2009

JOHN DOLL  
*Acting Director of the United States Patent and Trademark Office*